United States Patent
Pollack et al.

(10) Patent No.: US 11,509,423 B2
(45) Date of Patent: Nov. 22, 2022

(54) DYNAMIC REDUNDANCY FOR MULTIMEDIA CONTENT

(71) Applicant: Apple Inc., Cupertino, CA (US)

(72) Inventors: Daniel B. Pollack, San Jose, CA (US); Karthick Santhanam, San Jose, CA (US); Qian Sun, Cupertino, CA (US); Kevin Arthur Robertson, Sunnyvale, CA (US); Hsien-Po Shiang, Mountain View, CA (US); Erik Vladimir Ortega Gonzalez, Cupertino, CA (US); Christopher M. Garrido, Santa Clara, CA (US); Bradley F. Patterson, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/996,799

(22) Filed: Aug. 18, 2020

(65) Prior Publication Data
US 2021/0075544 A1  Mar. 11, 2021

Related U.S. Application Data

(60) Provisional application No. 62/907,467, filed on Sep. 27, 2019, provisional application No. 62/897,987, filed on Sep. 9, 2019.

(51) Int. Cl.
*H04L 1/08* (2006.01)
*H04L 69/04* (2022.01)
*H04L 49/90* (2022.01)

(52) U.S. Cl.
CPC .............. *H04L 1/08* (2013.01); *H04L 49/90* (2013.01); *H04L 69/04* (2013.01)

(58) Field of Classification Search
CPC ........................................................ H04L 1/08
See application file for complete search history.

(56) References Cited

U.S. PATENT DOCUMENTS

2016/0127215 A1 * 5/2016 Mani .................... H04L 1/0002
370/252
2019/0007060 A1 * 1/2019 Vafin .................... H04L 1/0015

* cited by examiner

*Primary Examiner* — Sulaiman Nooristany
(74) *Attorney, Agent, or Firm* — BakerHostetler (57) ABSTRACT

A device implementing dynamic redundancy may include at least one processor configured to receive, from another device, packet reception data corresponding to video data previously provided for transmission from the device to the other device and determine, based at least in part on the packet reception data, an amount of redundancy to apply to video data provided for transmission to the other device. The at least one processor may be further configured to determine, based at least in part on the amount of redundancy, an encoding scheme for applying the redundancy to the video data. The at least one processor may be further configured to apply the amount of redundancy to the video data based at least in part on the encoding scheme to generate redundant data items and provide the video data and the redundant data items for transmission to the other device.

20 Claims, 6 Drawing Sheets

DYNAMIC REDUNDANCY FOR MULTIMEDIA CONTENT

CROSS REFERENCE TO RELATED APPLICATIONS

This application claims the benefit of priority to U.S. Provisional Patent Application No. 62/907,467, entitled "Dynamic Redundancy," filed on Sep. 27, 2019, and claims the benefit of U.S. Provisional Patent Application No. 62/897,987, entitled "Multi-Path Connection Management, filed on Sep. 9, 2019, the disclosure of each of which is hereby incorporated herein in its entirety.

TECHNICAL FIELD

The present description relates generally to redundancy for transmitted data, including dynamic redundancy for transmitted data.

BACKGROUND

A user of an electronic device may stream audio and/or video to and/or from their electronic device. For example, the user may stream audio and/or video content from a server and/or the user may participate in a communication session, such as an audio and/or video conference session, with one or more other participants using their respective devices. Packet loss experienced by the electronic device while streaming audio and/or video may result in a degradation in the quality of the presented audio and/or video streams.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Packet loss experienced by an electronic device while streaming audio and/or video may result in a degradation in the quality of the presented audio and/or video streams. The degradation in the quality of the presented audio and/or video streams may be mitigated when the audio and/or video streams are transmitted, and/or provided for transmission, with redundant data which may be used by the electronic device to recover and/or replace any audio and/or video data lost and/or damaged during transmission, assuming the redundant data itself is not also lost and/or damaged during transmission. However, if the redundant data is lost and/or or damaged, or if the redundant data is received after a presentation time associated with the corresponding audio and/or video data, the redundant data may be unusable for recovering and/or replacing lost audio and/or video data. Furthermore, as the amount of redundant data increases, the amount of overhead, e.g. packet overhead, associated with transmitting the audio and/or video data may also increase, which may result in an increase in bandwidth and/or processing resource utilization.

The subject system utilizes dynamic redundancy to adaptively adjust a redundancy scheme used to generate and provide redundant data to an electronic based on one or more factors, such as in conjunction with transmitting audio and/or video data to the electronic device. For example, the subject system may utilize a buffer size at the electronic device, such as a jitter buffer size, to determine a separation between audio and/or video data and corresponding redundant data such that the loss of both the redundant data and the original audio and/or video data can be mitigated, while also ensuring that the redundant data is received by the electronic device prior to a presentation time associated with the audio and/or video data. The subject system may also dynamically modify the separation and/or size of the redundancy data based on one or more parameters associated with the usage of the jitter buffer at the electronic device, such as rate of drain, fullness, and the like.

The subject system may dynamically adjust an encoding scheme used to generate the redundant data based on one or more factors, such as to decrease the amount of packet overhead associated with transmitting the redundant data. For example, when the amount of redundancy increases, the subject system may increase the amount of audio and/or video data used to generate each individual redundant data item (e.g., the chunk size), thereby decreasing the number of chunks and corresponding packets that are transmitted, and/or provided for transmission, which decreases the corresponding packet overhead for transmitting the chunks and redundant data items (e.g., by re-amortizing the overhead over fewer packets).

Figure 1:
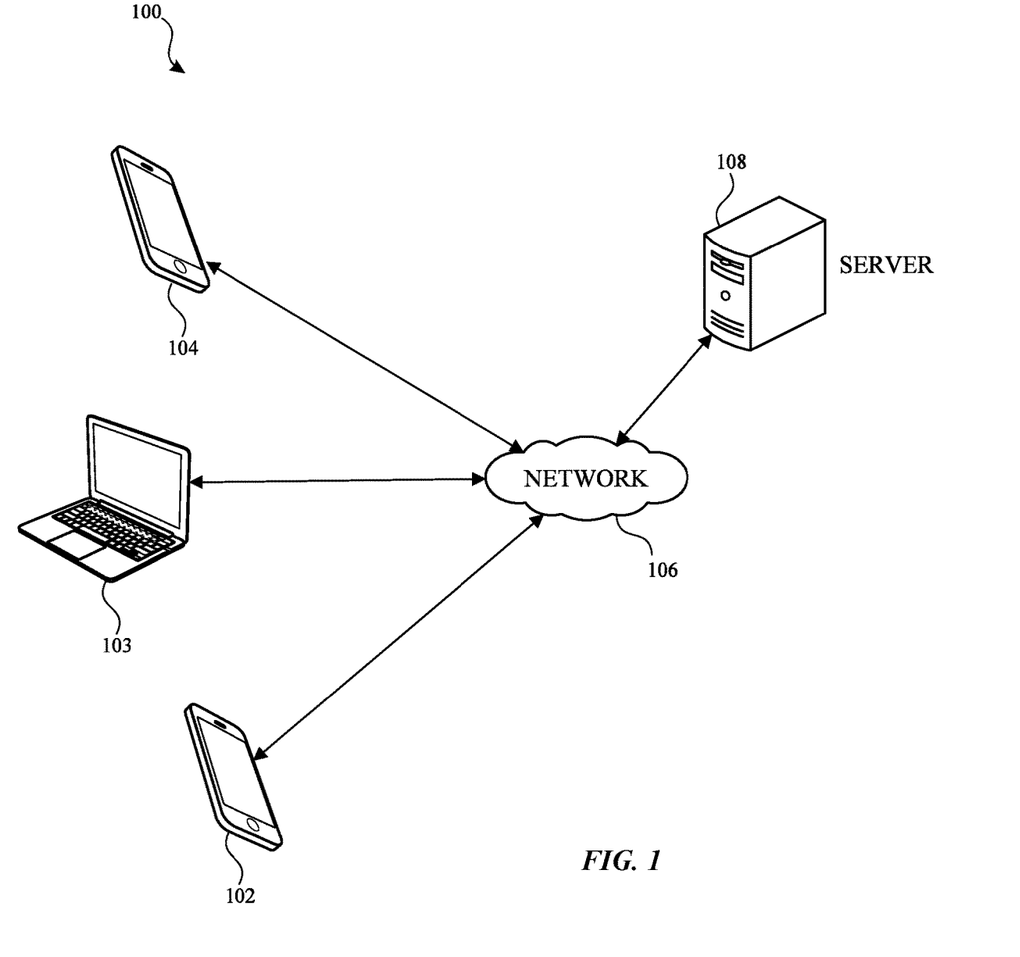
FIG. 1 illustrates an example network environment for implementing dynamic redundancy in accordance with one or more implementations.

FIG. 1 illustrates an example network environment 100 for implementing dynamic redundancy in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103, and 104, a network 106 and a server 108. The network 106 may communicatively (directly or indirectly) couple, for example, any two or more of the electronic devices 102-104 and/or the server 108. In one or more implementations, the network 106 may be an interconnected network of devices that may include, and/or may be communicatively coupled to, the Internet. For explanatory purposes, the network environment 100 is illustrated in FIG. 1 as including electronic devices 102-104 and a single server 108; however, the network environment 100 may include any number of electronic devices and any number of servers.

The server 108 may be, and/or may include all or part of the electronic system discussed below with respect to FIG. 6. The server 108 may include one or more servers, such as a cloud of servers, that may be used to facilitate in audio-video conferencing between the electronic devices 102-104. For explanatory purposes, a single server 108 is shown and discussed with respect to various operations, such as facilitating audio-video conferencing. However, these and other operations discussed herein may be performed by one or more servers, and each different operation may be performed by the same or different servers.

One or more of the electronic devices 102-104 may be, for example, a portable computing device such as a laptop computer, a smartphone, a smart speaker, a peripheral device (e.g., a digital camera, headphones), a tablet device, a wearable device such as a smartwatch, a band, and the like, or any other appropriate device that includes, for example, one or more wireless interfaces, such as WLAN (e.g., WiFi) radios, cellular radios, Bluetooth radios, Zigbee radios, near field communication (NFC) radios, and/or other wireless radios. In FIG. 1, by way of example, the electronic devices 102 and 104 are each depicted as a smartphone and the electronic device 103 is depicted as a laptop computer.

The electronic devices 102-104 may be configured to participate in communication sessions, such as audio-video conferencing sessions, for example, where two or more of the electronic devices 102-104 may participate in a conversation in which video and/or audio content streams (e.g., application data) are transmitted between the participant devices. Each of the electronic devices 102-104 may be, and/or may include all or part of, the device discussed below with respect to FIG. 2, and/or the electronic system discussed below with respect to FIG. 6.

In the subject system, one of the electronic devices 102-104, such as the electronic device 102, initiates a communication session, such as an audio and/or video communication session, with another of the electronic devices 103-104 and/or the server 108, such as the electronic device 104. The electronic device 102 may then transmit packets for the communication session to the electronic device 104, such as packets that include audio and/or video data.

The electronic device 102 may also utilize a redundancy scheme to generate redundant data corresponding to the transmitted audio and/or video data. The redundant data may be data that can be used by the electronic device 104 to recover and/or replace video and/or audio data that was damaged and/or lost during transmission. For example, the redundant data generated for the video data may be forward error correction data (e.g., FEC codewords), while the redundant data generated for the audio data may be one or more copies of previously transmitted (and/or subsequently transmitted) audio data.

In one or more implementations, the redundancy scheme may indicate an amount of redundancy to apply to the video data (if any), an amount of redundancy to apply to the audio data (if any), a maximum stride (or temporal spacing) between the audio data and the corresponding redundant data, an amount of video data from which to generate each redundant data item (e.g., the chunk size and/or the amount of video data to include in each forward error correction codeword), packet size, and the like.

In the subject system, the electronic device 102 may dynamically adjust and/or modify the redundancy scheme being applied based on one or more factors, such as a quality of the audio and/or video data, a target bit rate, a packet error rate corresponding to the audio and/or video data, a decoded audio quality at the electronic device 104, a decoded video quality at the electronic device 104, the size of a buffer, such as a jitter buffer, at the electronic device 104, the utilization of a such a buffer at the electronic device 104, the amount of redundancy being applied, and the like. In one or more implementations, the electronic device 104 may periodically and/or continuously provide feedback data to the electronic device 102, where the feedback data is indicative of one or more of the afore-listed factors.

In one or more implementations, the electronic device 102 may utilize a tiered structure, where each tier identifies one or more of an audio encoding quality and/or codec, a video encoding quality and/or codec, an amount of audio data redundancy, an amount of video data redundancy, a target bit rate, and the like. The electronic device 102 may select one of the tiers, and/or adaptively change between tiers, based on one or more of the afore-listed factors. An example system for architecture for implementing dynamic redundancy in this manner is discussed further below with respect to FIG. 3, and example processes for providing dynamic redundancy are discussed further below with respect to FIGS. 4 and 5.

Figure 2:
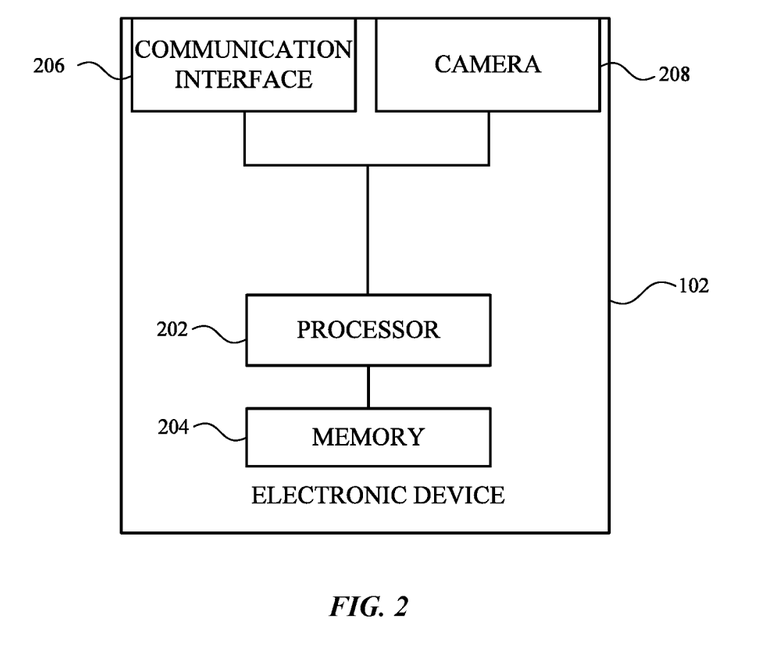
FIG. 2 illustrates an example electronic device that may implement dynamic redundancy in accordance with one or more implementations.

FIG. 2 illustrates an example electronic device 102 that may implement dynamic redundancy in accordance with one or more implementations. For example, the electronic device 102 of FIG. 2 can correspond to any of the electronic devices 102-104, or to the server 108 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a processor 202, a memory 204, a communication interface 206, and a camera 208. The processor 202 may include suitable logic, circuitry, and/or code that enable processing data and/or controlling operations of the electronic device 102. In this regard, the processor 202 may be enabled to provide control signals to various other components of the electronic device 102. The processor 202 may also control transfers of data between various portions of the electronic device 102. Additionally, the processor 202 may enable implementation of an operating system or otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The communication interface 206 may include suitable logic, circuitry, and/or code that enables wired or wireless communication, such as between any of the other electronic devices 103-104 and/or the server 108 over the network 106. The communication interface 206 may include, for example, one or more of a Bluetooth communication interface, a cellular communication interface (e.g., 3G, 4G, LTE, 5G, etc.), an NFC interface, a Zigbee communication interface, a WLAN communication interface, (WiFi, WiMAX, LiFi, 2.4 GHz, 5 GHz, etc.) communication interface, a USB communication interface, an Ethernet communication interface, a millimeter wave (e.g., 60 GHz) communication interface, or generally any communication interface. For explanatory purposes, the electronic device 102 is illustrated in FIG. 2 as including a single communication interface 206; however, the electronic device 102 may include any number of communication interfaces.

The camera 208 may be, and/or may include, an image sensor that is configured to capture video data, e.g. video frames. The electronic device 102 may further include one or more microphones (not shown) that are configured to capture audio data.

In one or more implementations, one or more of the processor 202, the memory 204, the communication interface 206, the camera 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
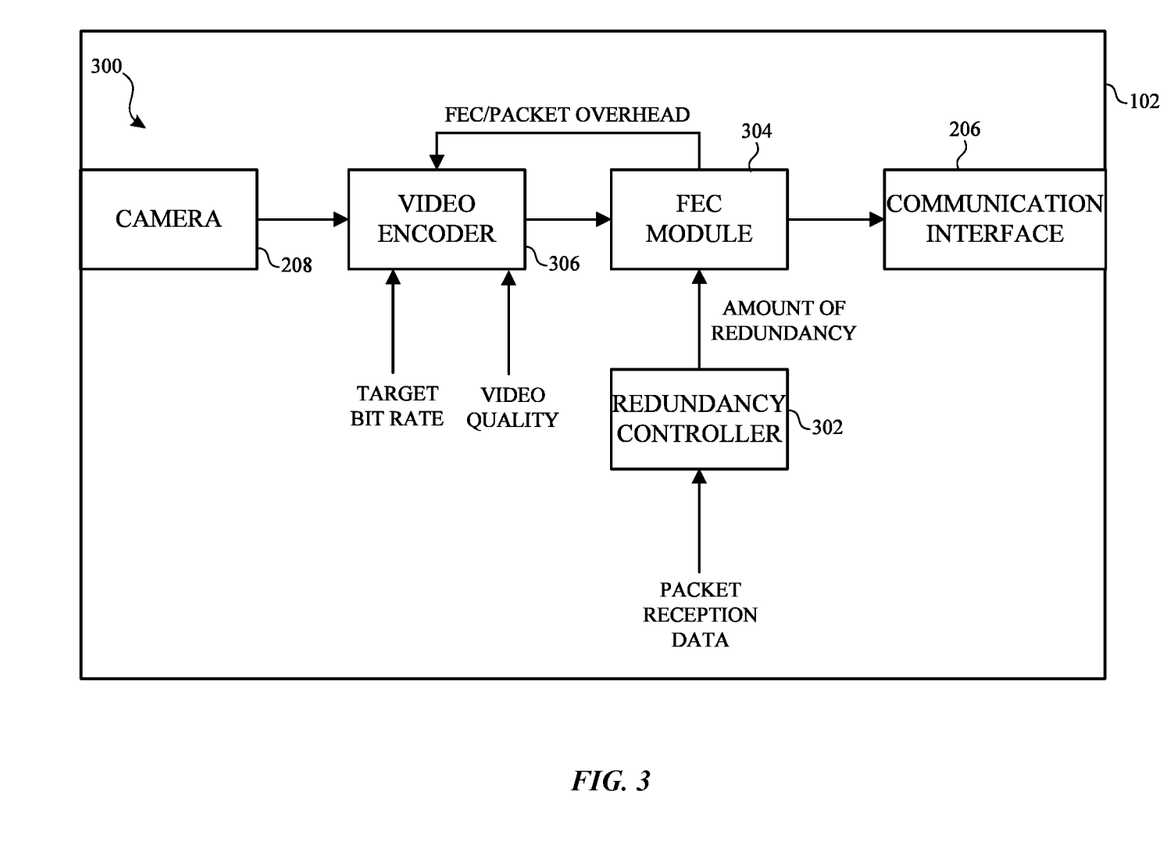
FIG. 3 illustrates an example system architecture for implementing dynamic redundancy in accordance with one or more implementations.

FIG. 3 illustrates an example system architecture 300 for implementing dynamic redundancy in accordance with one or more implementations. For explanatory purposes, the system architecture 300 is illustrated as being implemented by the electronic device 102 of FIG. 2. However, the system architecture 300 may be implemented by any of the electronic devices 102-104, and/or the server 108 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 300 includes the communication interface 206, the camera 208, a redundancy controller 302, a forward error correction (FEC) module 304, and a video encoder 306. For explanatory purposes, the system architecture 300 is illustrated as including the video encoder 306 and the FEC module 304; however, the system architecture may further include an audio encoder (not shown) and an audio redundancy module (not shown), which may also be communicatively coupled to the redundancy controller 302. Thus, the principles described herein with respect to the video encoder 306 and the FEC module 304 are also applicable to such an audio encoder and audio redundancy module.

In operation, the camera 208 captures video data, such as of a user of the electronic device 102 and passes the video data to the video encoder 306. The video encoder 306 encodes the video data in accordance with a particular codec, such as HEVC or any video codec, and passes the video data to the FEC module 304. The FEC module applies redundancy, e.g., FEC coding to the video data, and passes the packetized redundancy and video data to the communication interface for transmission to another one of the electronic devices 103-104, such as the electronic device 104.

The electronic device 104 receives the video data (and/or audio data) and determines one or more parameters corresponding to the transmitted video and/or audio data, such as a video packet loss rate, an audio packet loss rate, a decoded audio quality value, a decoded video quality value, a buffer (e.g., jitter buffer) fullness and/or rate of drain, a bit error rate, or generally any information that may be indicative of the reception of the audio and/or video at the electronic device 104. For example, the decoded audio quality value may be an indication of the objective quality of the decoded audio, and the decoded video quality value may be an indication of an objective quality of the decoded video, such as based on the frame rate of the decoded video (e.g., across tiers). The electronic device 104 may continuously and/or periodically (or aperiodically) transmit the determined parameters to the electronic device 102, such as in the form of packet reception data.

The redundancy controller 302 may use the packet reception data to dynamically adjust the redundancy scheme being applied to the transmitted audio and/or video data. The packet reception data may also be used to determine a quality of the audio and/or video data being transmitted and/or a target bit rate, e.g. based on an estimated available bandwidth. For example, based on the packet reception data the redundancy controller 302 may select a particular tier from a structure of tiers, where each tier indicates one or more of an audio encoding quality/codec, a video encoding quality/codec, an amount of redundancy to apply to audio data, an amount of redundancy to apply to video data, and the like. For example, the tiers may indicate different amounts of redundancy and/or video/audio quality, such as to account for different and/or changing network environments and/or corresponding packet loss rates. In one or more implementations, a low, or lowest tier, may indicate that only key frames (e.g., I-frames) are encoded and transmitted, such as at one frame per second. In this manner, the receiving electronic device can decode every frame that is received irrespective of whether any other frames were received, thereby being able to present at least some video frames.

The redundancy controller 302 may monitor one or more of the parameters included in the packet reception data over a rolling period of time. For example, the redundancy controller 302 may determine an exponential moving average based on one or more of the parameters included in the packet reception data. In one or more implementations, the redundancy controller 302 may track a moving average envelope which may include an upper envelope above the moving average and a lower envelope below the moving average.

Based on the parameters monitored by the redundancy controller 302 (e.g., in the form of the tracked moving average envelope), the redundancy controller 302 may select one of the aforementioned tiers which indicates the amount of redundancy to apply to the audio and/or video data. In one or more implementations, the redundancy controller 302 may implement a fast attack-slow decay methodology for selecting the tiers. For example, the redundancy controller 302 may adapt quickly to a detected increase in the monitored video and/or audio packet loss rate, such as by selecting a tier with an increased amount of audio and/or video redundancy, while the redundancy controller 302 may adapt more slowly to a decrease in the monitored video and/or audio packet loss rate, such as waiting for the decrease in the monitored video and/or audio packet loss rate to be sustained for a predetermined amount of time before selecting a tier with a reduced amount of audio and/or video redundancy. In one or more implementations, the redundancy controller 302 may implement hysteresis, such as to implement the aforementioned slow decay.

When the redundancy controller 302 selects a tier, the corresponding video and/or audio quality/codec is provided to the video encoder 306 and/or the audio encoder, respectively. The video and/or audio quality may refer to one or more of a bit rate, a frame rate, a resolution, and the like. The video encoder 306 is further provided with a target bit rate, such as a transmission bit rate for transmission of the video and corresponding redundant data.

The redundancy controller 302 further provides an indication of the amount of redundancy to the FEC module 304, and/or the audio redundancy module. The amount of redundancy with respect to the video data may be a percentage to be applied by the FEC module 304, such as 200%, 300%, or the like. In one or more implementations, the amount of redundancy may be in the form of an FEC code rate, such as 1/2, 1/3, and the like.

The amount of redundancy with respect to the audio data may be a number of copies of a given audio packet and/or bundle to be transmitted and/or an indication of the stride, or maximum temporal separation, between an audio packet/bundle and the corresponding redundancy data (e.g., such that the redundancy data arrives before the audio packet will be presented at the receiving device). In one or more implementations, the audio data may be included in different sized bundles, such as 20 milliseconds, 40 millisecond, 60 milliseconds, or any amount of time, and the bundles may be grouped into packets. The redundancy controller 302 may indicate an offset per packet payload and/or may indicate how much bundling to include (e.g. what size bundle) for generating the redundancy data. Thus, the redundancy controller 302 may specify for different spacing, framing, and/or bundling of the copies of the audio data (e.g., as permitted by the audio codec) that may be used for the redundancy data for the audio data.

The FEC module 304 receives the indication of the amount of redundancy to apply from the redundancy controller 302 and determines, based at least in part on the amount of redundancy, a chunk size for performing FEC encoding on the video data. The FEC module 304 may increase the chunk size as the amount of redundancy data increases. In this manner, the amount of overhead, such as packet overhead (e.g., RTP/UDP header overhead), associated with the video and redundant data is decreased, e.g., since the video data is being separated into larger, and consequently fewer, chunks, resulting in a smaller number of packets being transmitted, and/or provided for transmission. In one or more implementations, the chunk size may refer to the amount of video data from which each redundant data item is generated. In one or more implementations, the chunk size may indicate the amount of video data to include in each FEC codeword, and/or the chunk size may indicate an amount of data and/or redundancy data to include in each packet. In one or more implementations, the FEC module 304 may further determine the chunk size based at least in part on the video encoding quality/codec, which may be indicative of an amount of video data being transmitted, and/or provided for transmission.

The FEC module 304 provides an indication to the video encoder 306 of the amount of FEC and packet overhead being generated by the FEC module 304 for generating the redundant data with respect to the video data (e.g., per frame). The video encoder 306 may receive the overhead information from the FEC module 304, as well as the target bit rate, such as from the redundancy controller 302, and the video encoder 306 may adaptively encode the video data with the target bit rate as a constraint. For example, if the amount of FEC/packet overhead in conjunction with the encoded video will cause the target bit rate to be exceeded, the video encoder 306 may skip and/or drop one or more frames of the video data.

In one or more implementations, when the redundancy controller 302 has selected a tier from the tier structure, such as a tier corresponding to the highest quality audio and/or video available, and additional bandwidth remains available, the redundancy controller 302 may proactively increase the amount of redundancy being applied by the FEC module 304. In other words, the redundancy controller 302 may increase the amount of redundancy to utilize the available bandwidth, and irrespective of the monitored packet loss rates, which may not indicate that the additional redundant data is necessary under current conditions. In one or more implementations, the proactive application of redundancy may be referred to as 'always on' redundancy since the redundancy controller 302 will utilize any additional bandwidth with additional redundancy data irrespective of whether the monitored packet loss rates indicate that the additional redundancy data is necessary.

Figure 4:
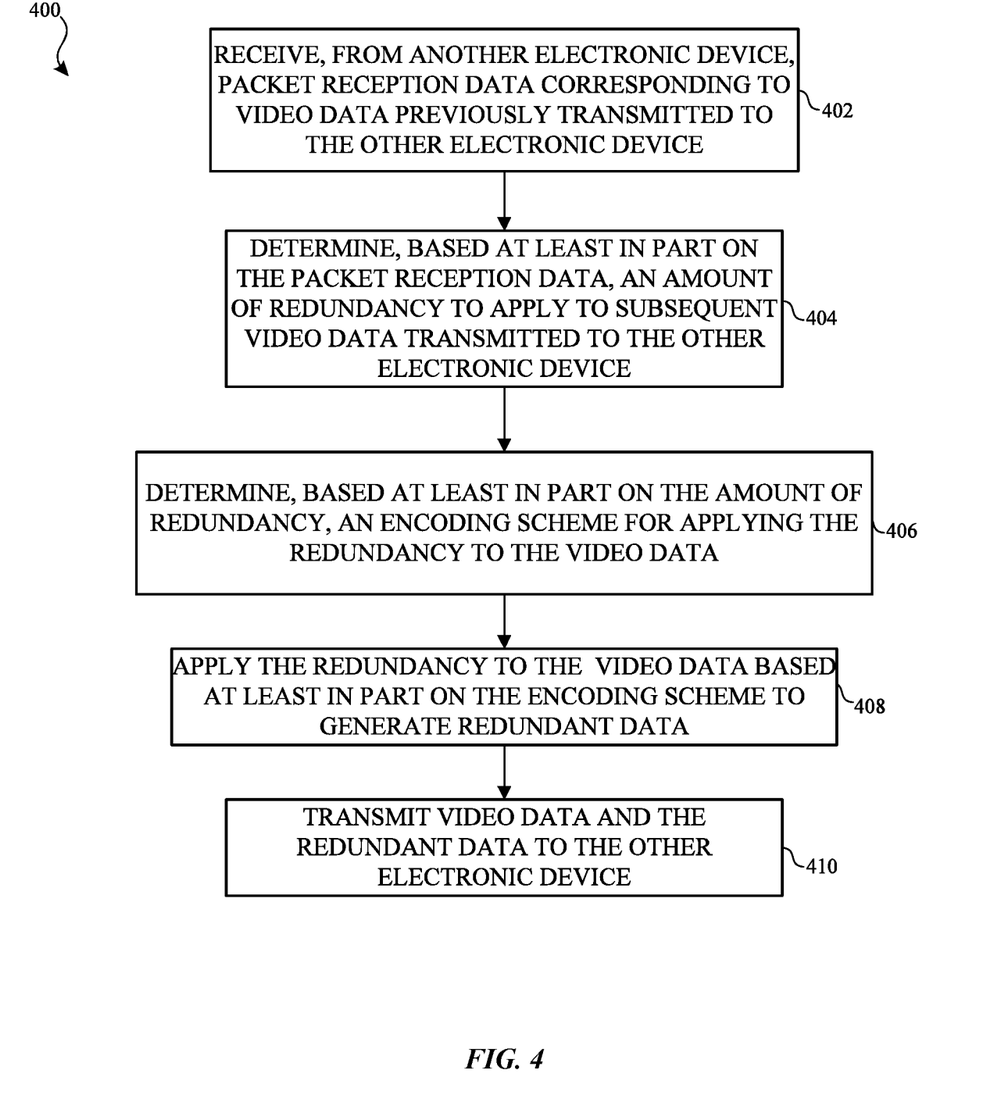
FIG. 4 illustrates a flow diagram of an example process of providing dynamic redundancy for video data in accordance with one or more implementations.

FIG. 4 illustrates a flow diagram of an example process 400 of providing dynamic redundancy for video data in accordance with one or more implementations. For explanatory purposes, the process 400 is primarily described herein with reference to the electronic devices 102, 104 of FIG. 1. However, the process 400 is not limited to the electronic devices 102, 104 of FIG. 1, and one or more blocks (or operations) of the process 400 may be performed by one or more other components of the server 108 and by other suitable devices (e.g., any of the electronic devices 102-104). Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The process 400 may be initiated in conjunction with the electronic device 102 transmitting audio and/or video data to another electronic device, such as the electronic device 102. For example, the electronic device 102 may transmit audio and/or video data to the electronic device 102 as part of a communication session, such as an audio and/or video conference. The electronic device 102 receives, from the other electronic device 104, packet reception data corresponding to video data previously transmitted, and/or provided for transmission, to the other electronic device 104 (402). The packet reception data may include audio and/or video bit error rate, packet error rate, packet loss rate, and the like. In one or more implementations, the packet reception data may include one or more objective audio and/or video quality metrics.

The electronic device 102 may determine, based at least in part on the packet reception data, an amount of redundancy to apply to subsequent video data transmitted, and/or provided for transmission, to the other electronic device 104 (404). For example, the redundancy controller 302 of the electronic device 102 may select a particular tier that indicates an amount of redundancy to be applied, such as based on an exponential moving average envelope with respect to the audio and/or video packet loss rate, where the amount of redundancy is increased as the packet loss rate increases. The electronic device 102 may determine, based at least in part on the amount of redundancy, an encoding scheme for applying the redundancy to the video data (406). For example, the FEC module 304 may determine a chunk size based at least in part on the amount of redundancy being applied. In one or more implementations, the FEC module 304 may further determine the chunk size based at least in part on the quality and/or particular encoding of the video data, which may be indicative of a size of the video data being transmitted, and/or provided for transmission.

The electronic device 102 may apply the determined redundancy to the video data based at least in part on the encoding scheme to generate redundant data (408). For example, the FEC module 408 may perform FEC coding on the video data output by the video encoder 306. In one or more implementations, the FEC module 304 may use the chunk size to determine an amount of video data to include in each FEC codeword. In one or more implementations, the FEC module 304 may use the chunk size to packetize the FEC codewords into packets of a particular size.

The electronic device 102 transmits the video data and the generated redundant data to the other electronic device 104 (410). For explanatory purposes, the process 400 is described herein with respect to video data and FEC encoding. However, the process 400 is also applicable to audio data and generating redundant copies of audio bundles or data items, where the bundles may be sized differently and/or may be grouped into different sized packets.

Figure 5:
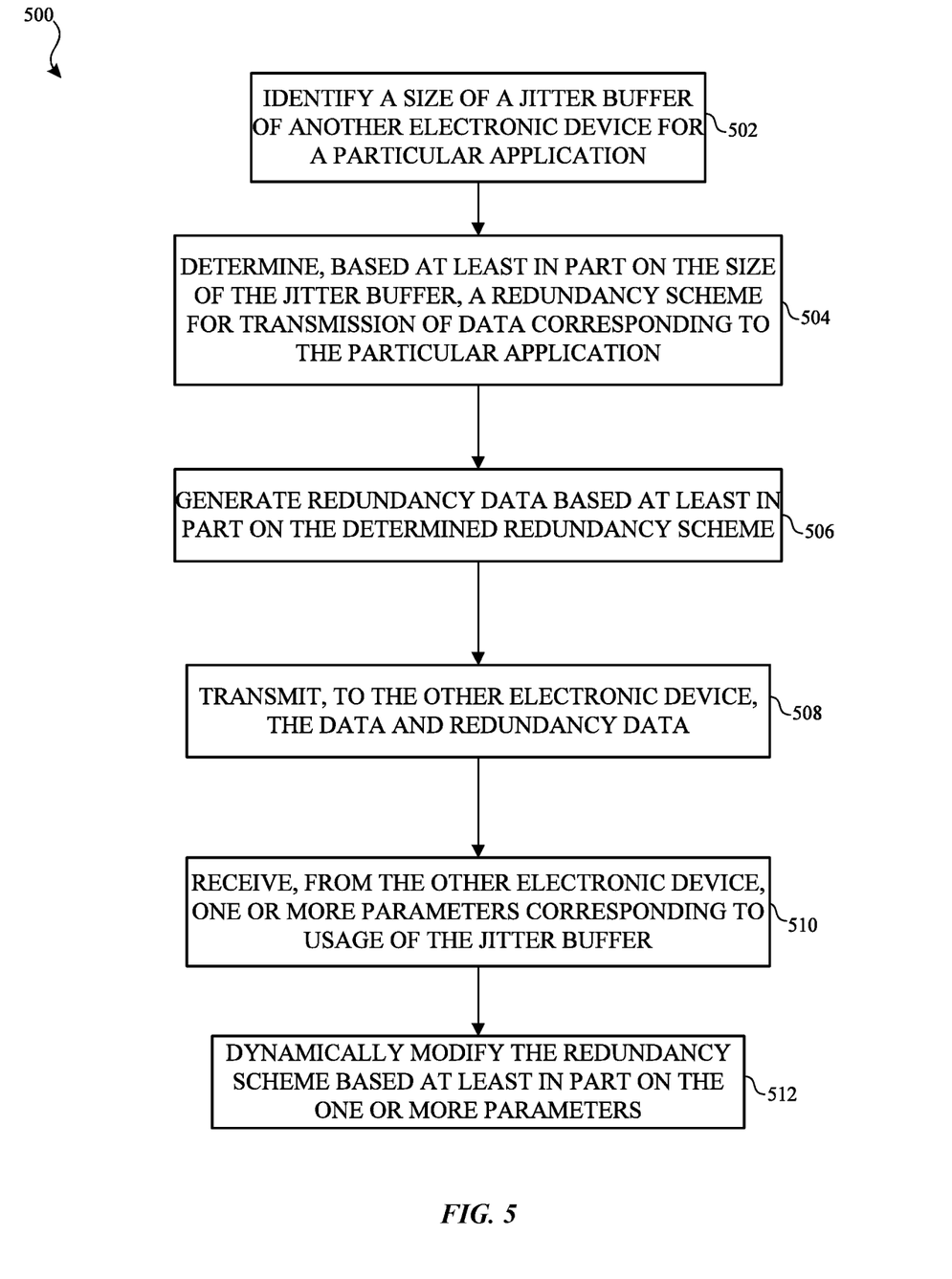
FIG. 5 illustrates a flow diagram of an example process of providing dynamic redundancy for based on jitter buffer size in accordance with one or more implementations.

FIG. 5 illustrates a flow diagram of an example process 500 of providing dynamic redundancy for based on jitter buffer size in accordance with one or more implementations. For explanatory purposes, the process 500 is primarily described herein with reference to the electronic devices 102, 104 of FIG. 1. However, the process 500 is not limited to the electronic devices 102, 104 of FIG. 1, and one or more blocks (or operations) of the process 500 may be performed by one or more other components of the server 108 and by other suitable devices (e.g., any of the electronic devices 102-104). Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The process 500 may begin when the electronic device 102 initiates a communication session with another electronic device 104 for a particular application, such as an audio and/or video conferencing application. The electronic device 102 may identify a size of a jitter buffer of the other electronic device 104 for the particular application (502). For example, the electronic device 102 may identify the jitter buffer size based on a minimum jitter buffer size for the particular application. In one or more implementations, the electronic device 104 may provide an indication of the jitter buffer size to the electronic device 102, such as through feedback information.

In one or more implementations, the jitter buffer be used to ensure the continuity of the decoded audio data by smoothing out packet arrival times during periods of network congestion. Thus, the size of the jitter buffer may be indicative of a minimum amount of time from when a packet, such as an audio packet, is received at the electronic device 104 until when the packet will be decoded and presented to the user of the electronic device 104. Accordingly, any redundancy data for the packet that is received after the presentation time for the packet will not be usable by the electronic device 104. However, it may be desirable to maximize the separation between the transmitted data and the corresponding redundancy data, such as to avoid having both the data and the transmitted data lost due to the same burst and/or transmission error.

Thus, the electronic device 102 determines, based at least in part on the size of the jitter buffer, a redundancy scheme for the data transmitted, and/or provided for transmission, for the particular application (604). The redundancy scheme may be characterized by one or more of a redundancy data pattern (e.g. interleaving pattern), stride, and/or distance value, and/or an amount of redundancy to be applied. The redundancy data may be, for example, copies of the original data, such as for audio data, and/or a forward error correction coding corresponding to the original data, such as for video data.

The redundancy scheme may be determined such that the redundancy packets and/or data is separated or spread from the original data, such as interleaved, to make the transmitted data more resilient to bursts and to increase the likelihood that at least some of the original data or the redundancy data is received at the electronic device 104. In one or more implementations, the redundancy may be selected based at least in part on the underlying bit rate of audio and/or video data being transmitted. For example, at a low bit rate, the redundancy scheme may add as much forward error correction as possible. The redundancy scheme may also utilize different size packets and/or different codecs for redundancy data when the underlying content, e.g. audio, supports different size packets and/or different codecs. In one or more implementations, increasing the size of the packets may decrease the amount of header overhead which may increase the total data rate.

After determining the redundancy scheme (504), the electronic device 102 may generate redundancy data based at least in part on the determined redundancy scheme (506). The generation of the redundancy data may also include spacing or spreading/patterning the redundancy data from the original data such that the original data and redundancy data are separated, and such that the maximum separation between the original data and a corresponding redundancy data item does not exceed the minimum jitter buffer size at the other electronic device 104.

In one or more implementations, when the redundancy data includes multiple copies of the same original data, the electronic device 102 may spread the copies out from one another, and from the original data, while ensuring that the maximum separation between the original data and each of the copies is maintained. In one or more implementations, the electronic device 102 may generate less than the determined amount of redundancy, or no redundancy, for given data if the insertion of the redundancy data would exceed the maximum separation. The electronic device 102 may transmit, to the other electronic device 104, the data and redundancy data for the application (508).

The electronic device 102 may receive, from the other electronic device 104, one or more parameters corresponding to the usage of the jitter buffer (510). For example, the parameters may include fullness and/or rate of drain of the jitter buffer. In one or more implementations, the one or more parameters may further include one or more packet loss values measured at the other electronic device 104, such as audio and/or video packet loss rate, packet error rate, bit error rate, and the like. In one or more implementations, the one or more parameters may further include metrics of quality of the underlying content, such as an objective metric of audio quality, and/or an objective metric of video quality, such as by sweeping packet loss rate across tiers for frame rate.

Based least in part on the parameters, the electronic device 102 may dynamically modify the redundancy scheme (512). For example, if the jitter buffer is empty, the electronic device 102 may reduce the amount of redundant data being transmitted to transmit the underlying data to the electronic device 104 more quickly. If the jitter buffer is full, the electronic device 102 may increase the amount of redundancy, e.g. proactively and/or opportunistically.

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, social network identifiers, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

Figure 6:
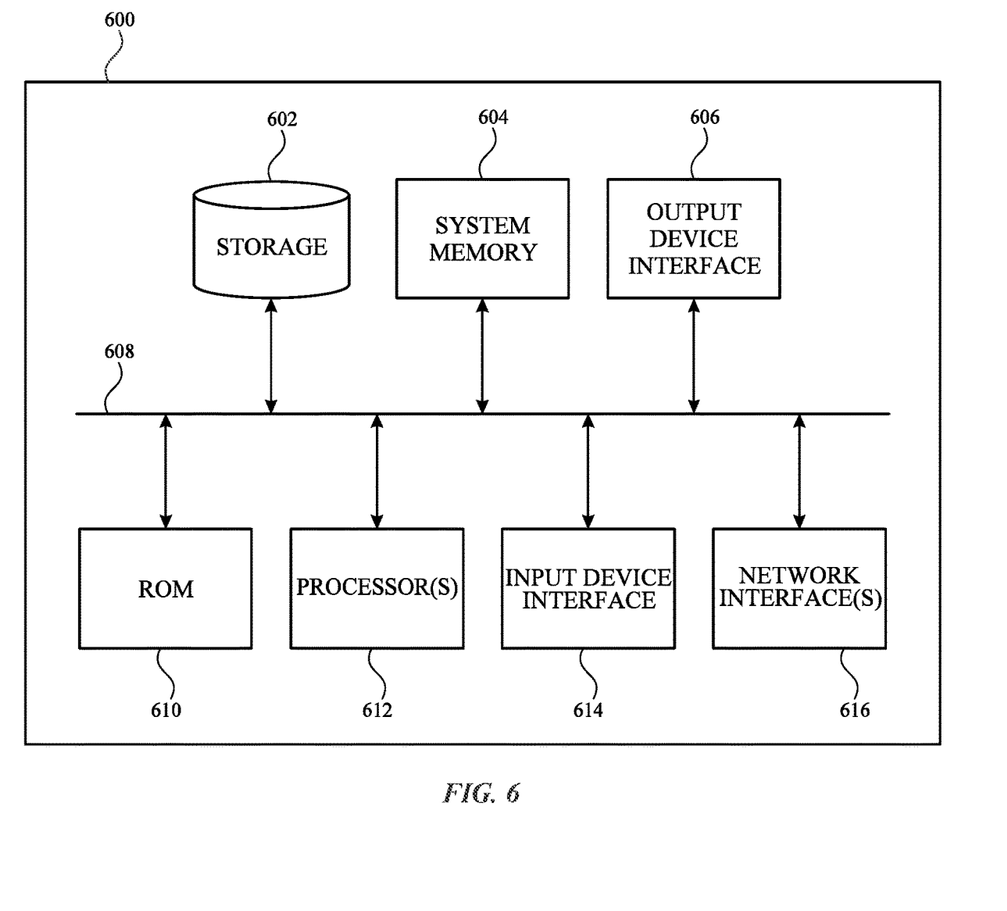
FIG. 6 illustrates an example electronic system with which aspects of the subject technology may be implemented in accordance with one or more implementations.

FIG. 6 illustrates an electronic system 600 with which one or more implementations of the subject technology may be implemented. The electronic system 600 can be, and/or can be a part of, one or more of the electronic devices 102-104, and/or one or the server 108 shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, such as the server 108 shown in FIG. 1, through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
    a memory; and
    at least one processor configured to:
        receive, from another device, packet reception data corresponding to video data packets previously transmitted from the device;
        determine, based at least in part on the packet reception data and a video encoding quality of the video data, an amount of redundancy to apply to video data provided for transmission to the other device;
        determine, based at least in part on the amount of redundancy, an encoding scheme for applying the redundancy to the video data;
        apply the amount of redundancy to the video data based at least in part on the encoding scheme to generate redundant data items; and
        provide the video data and the redundant data items for transmission to the other device.

2. The device of claim 1, wherein the packet reception data comprises a packet loss rate corresponding to the video data previously provided for transmission.

3. The device of claim 1, wherein the encoding scheme indicates an amount of the video data used to generate a respective redundant data item.

4. The device of claim 3, wherein the at least one processor is further configured to:
    separate the video data into chunks based at least in part on the determined amount of the video data used to generate the respective redundant data item; and
    generate the respective redundant data item using the chunks of the video data.

5. The device of claim 3, wherein the at least one processor is further configured to:
    determine a change to the amount of redundancy based at least in part on an other packet reception data received from the other device;
    determine, based at least in part on the changed amount of redundancy, another encoding scheme for applying the redundancy; and
    applying the changed amount of the redundancy to the video data based at least in part on the other encoding scheme.

6. The device of claim 5, wherein the amount of the video data used to generate the respective data item indicated by the encoding scheme differs from another amount of the video data used to generate the respective data item indicated by the other encoding scheme.

7. The device of claim 1, wherein the at least one processor is further configured to:
 determine that additional bandwidth is available for transmission of the video data; and
 increase the amount of redundancy applied based on the additional bandwidth available and irrespective of the packet reception data.

8. A non-transitory machine readable medium comprising code that, when executed by one or more processors, causes the one or more processors to perform operations, the code comprising:
 code to select, based at least in part on a packet loss rate, an encoding tier of a plurality of encoding tiers, wherein the encoding tier indicates both an amount of redundancy to apply to video data provided for transmission to another device and a video encoding quality for the video data;
 code to determine, based at least in part on the amount of redundancy, an encoding scheme for applying the redundancy to the video data;
 code to apply the amount of redundancy to the video data based at least in part on the encoding scheme to generate redundant data items; and
 code to provide the video data and the redundant data items for transmission to the other device.

9. The non-transitory machine readable medium of claim 8, wherein the encoding scheme indicates an amount of the video data used to generate a respective redundant data item.

10. The non-transitory machine readable medium of claim 9, wherein the at least code further comprises:
 code to separate the video data into chunks based at least in part on the determined amount of the video data used to generate the respective redundant data item; and
 code to generate the respective redundant data item using the chunks of the video data.

11. The non-transitory machine readable medium of claim 8, wherein the packet loss rate corresponds to the video data previously provided for transmission.

12. A method comprising:
 receiving, by a device and from another device, packet reception data corresponding to video data packets previously transmitted from the device;
 jointly determining, based at least in part on the packet reception data, an amount of redundancy to apply to video data provided for transmission to the other device and a video encoding quality for the video data;
 determining, based at least in part on the amount of redundancy, an encoding scheme for applying the redundancy to the video data;
 applying the amount of redundancy to the video data based at least in part on the encoding scheme to generate redundant data items; and
 providing the video data and the redundant data items for transmission to the other device.

13. The method of claim 12, wherein the packet reception data comprises a packet loss rate corresponding to the video data previously provided for transmission.

14. The method of claim 12, wherein the encoding scheme indicates an amount of the video data used to generate a respective redundant data item.

15. The method of claim 14, further comprising:
 separating the video data into chunks based at least in part on the determined amount of the video data used to generate the respective redundant data item; and
 generating the respective redundant data item using the chunks of the video data.

16. The method of claim 14, further comprising:
 determining a change to the amount of redundancy based at least in part on an other packet reception data received from the other device;
 determining, based at least in part on the changed amount of redundancy, another encoding scheme for applying the redundancy; and
 applying the changed amount of the redundancy to the video data based at least in part on the other encoding scheme.

17. The method of claim 16, wherein the amount of the video data used to generate the respective data item indicated by the encoding scheme differs from another amount of the video data used to generate the respective data item indicated by the other encoding scheme.

18. The method of claim 12, further comprising:
 determining that additional bandwidth is available for transmission of the video data; and
 increasing the amount of redundancy applied based on the additional bandwidth available and irrespective of the packet reception data.

19. The non-transitory machine readable medium of claim 8, wherein each respective tier of the plurality of tiers indicates a respective amount of redundancy to apply to the video data and a respective video encoding quality for the video data.

20. The non-transitory machine readable medium of claim 8, wherein the code further comprises code to encode the video data in accordance with the video encoding quality indicated by the selected encoding tier of the plurality of encoding tiers.

* * * * *

UNITED STATES PATENT AND TRADEMARK OFFICE
CERTIFICATE OF CORRECTION

PATENT NO. : 11,509,423 B2
APPLICATION NO. : 16/996799
DATED : November 22, 2022
INVENTOR(S) : Daniel B. Pollack et al.

It is certified that error appears in the above-identified patent and that said Letters Patent is hereby corrected as shown below:

In the Claims

Column 17, Line 36 Claim 10: Replace "wherein the at least code further comprises:" with --wherein the code further comprises:--.

Signed and Sealed this
Seventh Day of February, 2023

Katherine Kelly Vidal
*Director of the United States Patent and Trademark Office*